United States Patent [19]
Loos

[11] 3,943,822
[45] Mar. 16, 1976

[54] TOOTHED TOOL HAVING CUTTING EDGES ON THE TOOTH SURFACES

[75] Inventor: Herbert Loos, Munich, Germany

[73] Assignee: Carl Hurth Maschinen und Zahnradfabrik, Munich, Germany

[22] Filed: Jan. 27, 1975

[21] Appl. No.: 544,045

[30] Foreign Application Priority Data
Jan. 30, 1974  Germany............................ 2404279

[52] U.S. Cl. .............................. 90/1.6 A; 29/103 R
[51] Int. Cl.² ....................... B23F 19/06; B26D 1/12
[58] Field of Search .......... 29/103 R, 103 C, 103 B; 90/1.6 A

[56] References Cited
UNITED STATES PATENTS

| | | | |
|---|---|---|---|
| 3,169,447 | 2/1965 | Hurth............................ | 90/1.6 A X |
| 3,182,557 | 5/1965 | Hurth.............................. | 90/1.6 A |
| 3,208,128 | 9/1965 | Grandi et al...................... | 29/103 R |

*Primary Examiner*—Harrison L. Hinson
*Attorney, Agent, or Firm*—Woodhams, Blanchard and Flynn

[57] ABSTRACT

Gear cutting tool. There is provided a toothed tool for the plunge cut shaving of a gear workpiece having in the tooth surfaces a plurality of grooves whose edges constitute cutting edges, which grooves are spaced apart to define increments on each tool tooth equal to the number of teeth of the workpiece or one whole multiple thereof, and wherein when the tool is in a crossed axes relationship with the workpiece axis said cutting edges of those tool teeth spaced circumferentially a number of teeth equal to the number of teeth on the workpiece, or an integral multiple thereof, define a helix whose portion diametrically opposite the common perpendicular between said axes when viewed along said axis toward said workpiece forms an angle with the workpiece axis which is smaller than the complement of the angle between the tool axis and the workpiece axis. Thus, when said tool axis is rotated with respect to said workpiece axis in a clockwise direction, said cutting edges form a lefthand helix and when said tool axis is rotated with respect to said workpiece axis in a counterclockwise direction, said cutting edges define a righthand helix.

9 Claims, 5 Drawing Figures

TOOTHED TOOL HAVING CUTTING EDGES ON THE TOOTH SURFACES

FIELD OF THE INVENTION

The invention relates to a toothed tool, the tooth surfaces of which have grooves extending from the tooth addendum to the tooth dedendum forming cutting grooves for shaving of gears, same adapted for use on a machine in which the tool spindle is angularly rotated relative to the workpiece spindle, as seen from the tool toward the workpiece along the common perpendicular to the crossed axes in either a clockwise or a counterclockwise direction.

BACKGROUND OF THE INVENTION

It is known to use so-called shaving gears for precision working of gears, which shaving gears have grooves extending from the top to the bottom in the tooth surfaces and forming cutting edges. Tool and workpiece roll on one another with crossed axes, from which results a sliding of the one tooth surface relative to the counter surface in the axial direction of the tooth. The longitudinally sliding cutting edges remove chips. In the so-called plunge cut shaving there occurs, in contrast to all other shaving methods, no further longitudinal feed, so that the axial sliding caused by the crossed axes is the only longitudinal movement. In order that the cutting effect is distributed onto the entire axial length of the workpiece teeth, the cutting edges are arranged in a staggered manner on the successive tool teeth.

SUMMARY OF THE INVENTION

The basic purpose of the invention is to improve the action of the above-described tools for increasing the surface quality on the workpiece tooth surface. The inventor has found that the quality of the produced surface depends first on the direction of the crossed-axes angle and second on the nature of the staggering of the cutting grooves. The basic purpose of the invention is attained in the case of a crossed-axes angle having the tool axis rotated in clockwise direction with respect to the workpiece axis and with the tool having those cutting grooves in the tooth surfaces arranged in a left-handed helix wherein said helix is defined by grooves on teeth which latter are spaced apart circumferentially on the tool in increments equal to the number of teeth of the workpiece or a whole multiple thereof.

For a device, in which the crossed-axes angle has the tool axis rotated in a counterclockwise direction with respect to the workpiece axis, the purpose is attained by a tool on which the grooves in the tooth surfaces are arranged in a right-handed helix wherein said helix is defined by grooves on the teeth which are spaced apart circumferentially on the tool in increments equal to the number of teeth of the workpiece or a whole multiple thereof.

Thus, when the axes of tool and workpiece cross, the edges of said cutting grooves are positioned on corresponding sides on the tool teeth, to define a helix, and said teeth are spaced apart circumferentially in increments equal to the number of workpiece teeth. Same forms an angle 23 with the workpiece axis as viewed toward the tool with the workpiece lying therebelow and at and along the common perpendicular which angle 23 as seen on the side of the tool remote from the workpiece is smaller than the complementary angle to the crossed-axes angle, that is, said angle 23 is smaller than 90° minus the crossed-axes angle.

BRIEF DESCRIPTION OF THE DRAWINGS

The invention is described with reference to the exemplary embodiment illustrated in FIGS. 1 to 5.

In the drawings.

DETAILED DESCRIPTION

Figure 1:
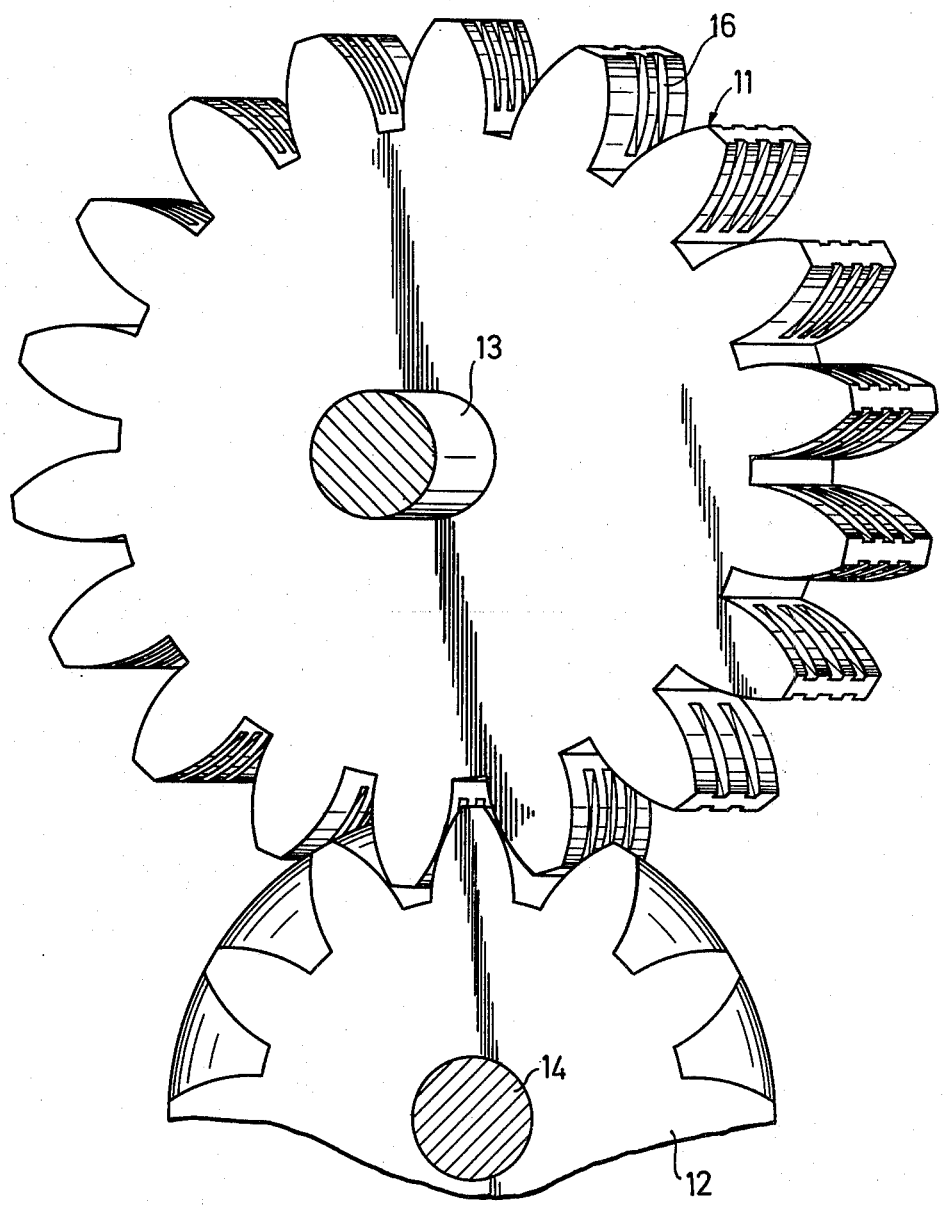
FIG. 1 is a side view of the mating of a shaving gear and a workpiece.
Figure 2:
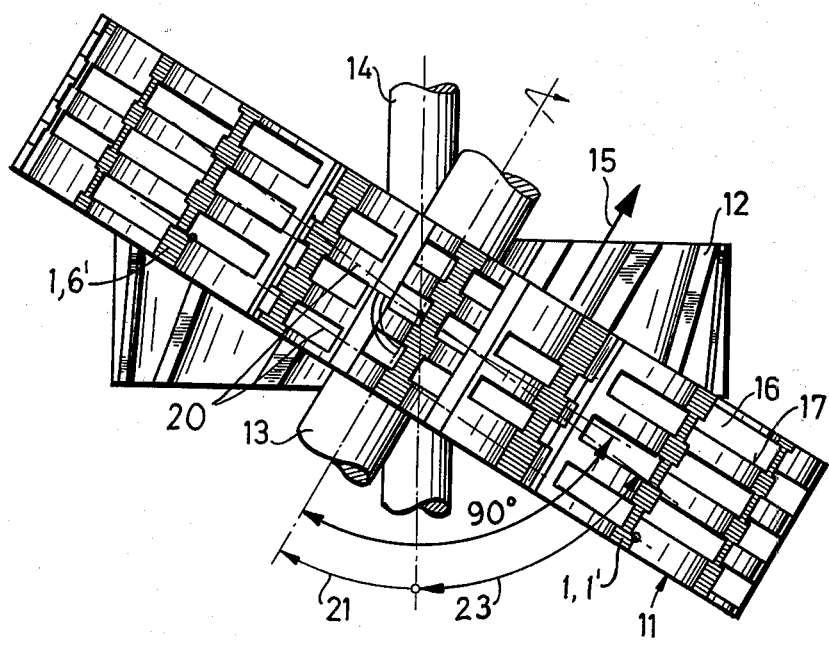
FIG. 2 illustrates the shaving gear and the workpiece as seen from the shaving gear looking toward the workpiece.

FIGS. 1 and 2 illustrate schematically the engagement of a shaving gear 11 with a toothed gear 12 which is to be worked by the shaving gear. The shafts 13,14, about which the elements rotate, are spaced from each other but lie in intersecting planes from which there results, during rolling a longitudinal sliding, such as in the direction of the arrow 15, of the shaving gear surface relative to the toothed gear surface. The teeth of the shaving gear have a number of grooves 16 in their surfaces, the edges of which grooves form cutting edges 17, which latter remove chips due to the longitudinal sliding. The support and drive of such a workpiece and tool (shaving gear) are already well known and are therefore neither illustrated nor described here. A mechanism for carrying out a longitudinal feed is not provided on the device or machine, so that the chips are removed merely as a result of the above-mentioned longitudinal sliding, same being generally identified with plunge cut shaving. In order that the edges of the several tool teeth do not always work the same surfaces of the gear and fail to work other surfaces, the grooves and thus the cutting edges are arranged in a staggered relationship, namely the staggering is carried out as shown in FIG. 3.

Figure 3:
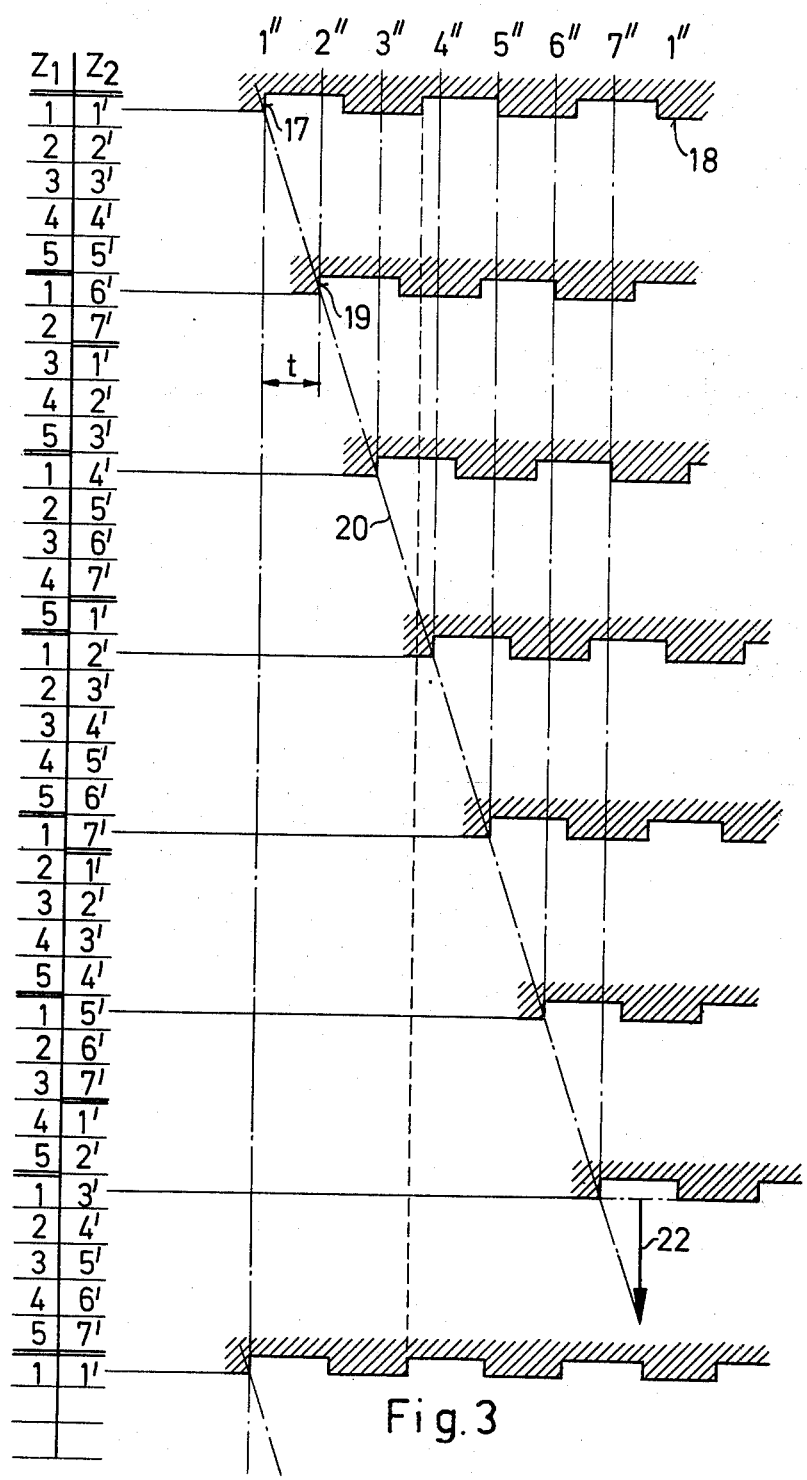
FIG. 3 is an enlarged schematic illustration of the arrangement of the staggered cutting grooves, wherein only one tooth surface of the shaving gear teeth is illustrated in cross section. The surfaces were drawn of only those teeth which partake in the so-called spacing increments according to the invention, while the surfaces which are of no interest in this regard were omitted.

FIG. 3 schematically illustrates the unwinding of a shaving gear during multiple rotations, wherein, however, only one surface 18 of the teeth which are of interest in connection with the invention is illustrated. The teeth, or their surfaces, which lie between said teeth of interest are not illustrated; however, same are considered in the right column on the left side of FIG. 3 under $Z_2$. The column $Z_2$ indicates thus the sequence of the shaving teeth, which are identified by numbers 1', 2', 3', etc. In this example, the tool has seven teeth. The sequence 1' to 7' is repeated five times and it is illustrated schematically in FIG. 3 that the shaving gear will rotate five times during the illustrated analysis. Of course, it is recognized that a shaving gear has more than seven teeth in normal practice, but in contrast with the more normal situation as shown in FIG. 1, an unusually small number of teeth is here chosen for ease in illustration. In addition to the column $Z_2$, a number column $Z_1$ is listed, which symbolizes the sequence of the workpiece teeth which mate with the shaving gear teeth during rolling. Here too, in contrast to FIG. 1 for clarity, the very small number of teeth of five is chosen.

To explain the invention, attention will be confined to only the tooth 1 of the workpiece. At the start of a rolling sequence, one surface of the workpiece tooth 1 will contact the surface 18 of the shaving gear 1'. Thus, the surface of the workpiece tooth 1 is worked by the cutting edges 17 of the shaving gear tooth 1' and said cutting edges lie in one plane 1''. As rolling continues, the workpiece tooth 1 will contact the next time the shaving gear tooth 6', the surface of which is illustrated in FIG. 3. (The surfaces of the teeth 2' to 5', since they are of no interest at this point, are not illustrated.) In order that the cutting edges 19 of this tooth works a different part of the workpiece tooth surface, the edges are offset by the amount $t$ (called edge step) with respect to the edge 17, and hence the cutting edge of tooth 6' lies in the plane 2''. Thus, during rolling, the workpiece tooth 1 contacts successively the shaving gear teeth 1' – 6' – 4' – 2' – 7' – 5'0 – 3'. This fixes the location of the edges of all shaving gear teeth. If one would transfer them onto the shaving gear surfaces which are not illustrated in FIG. 3, they would appear to lie at random on the surfaces. Their order is determined by the edges of the shaving gear teeth 1' – 6' – 2' – 7' – 5' – 3', which are axially spaced in movements equal to the number of teeth of the workpiece contacting the periphery of the shaving gear (tool), and same follow the helix 20 (or 20A in FIG. 5).

The lead direction of this helix is important. According to the inventor's discovery, an improved surface is obtained on the workpiece surface if the lead direction of the helix, wherein lies the cutting edges of the teeth which are spaced apart in the above-described increments, is selected with respect to the direction of the crossed-axes angle as described hereinafter.

To further explain the figures, it is also pointed out that FIGS. 1 and 2 show a crossed-axes angle in which the tool spindle 13 is offset from the workpiece spindle in a clockwise direction. FIG. 3 schematically illustrates a shaving gear in which the grooves or cutting edges on teeth which are spaced circumferentially a number of teeth equal to the number of teeth on the workpiece, or an integral multiple thereof, form a left-handed helix.

Figure 4:
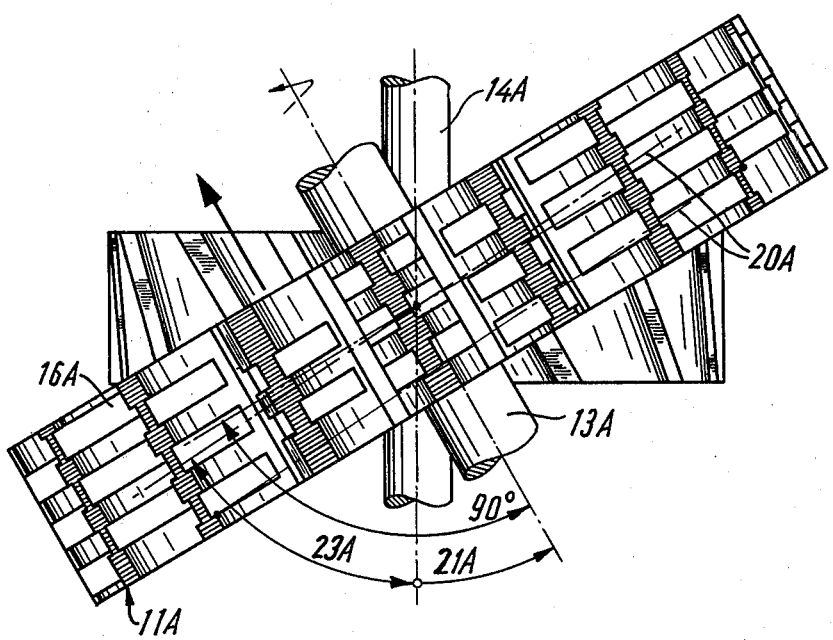
FIGS. 4 and 5 correspond to FIGS. 2 and 3 in illustrating a different embodiment of the invention.
Figure 5:
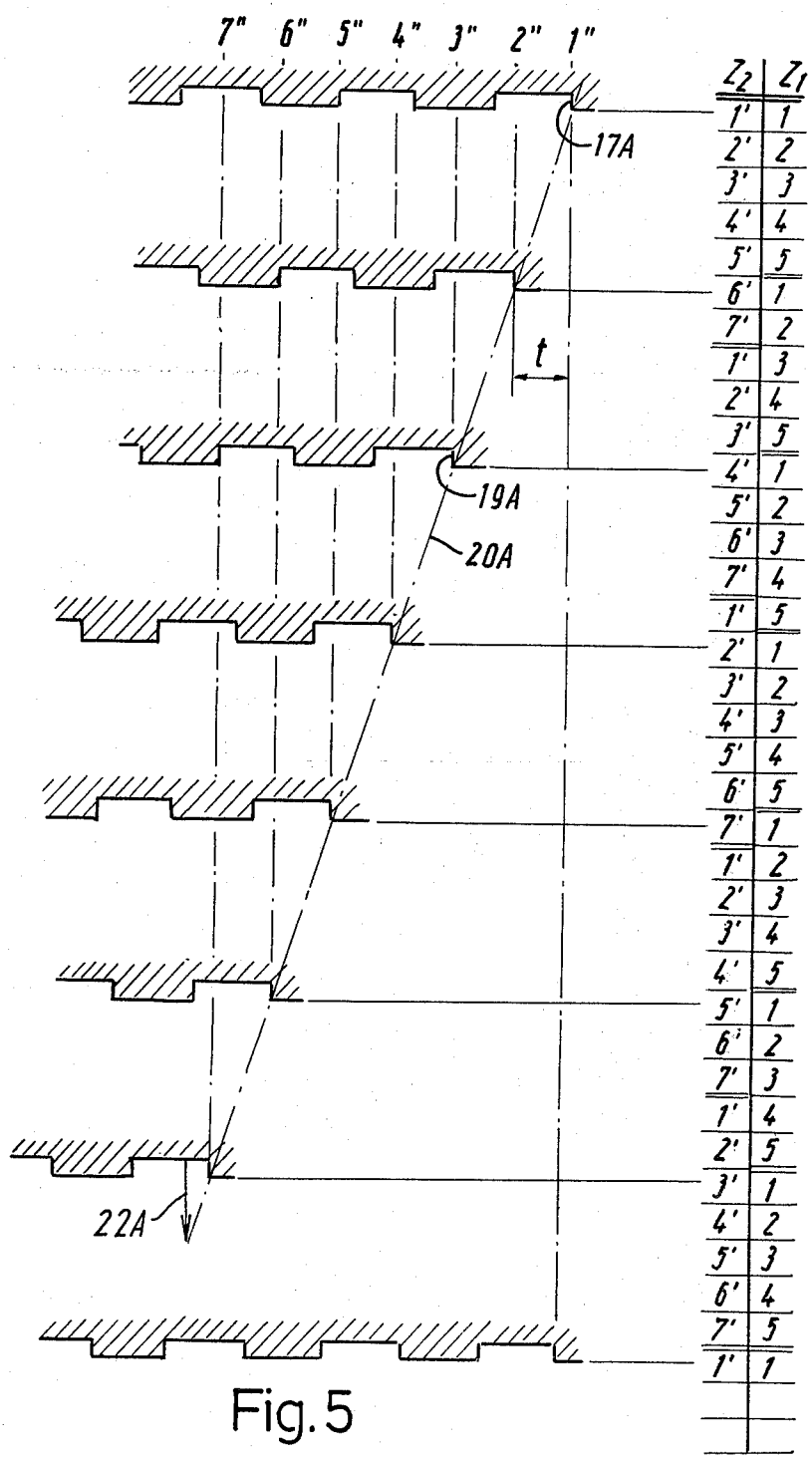

A mirror image situation is illustrated in FIGS. 4 and 5 wherein the identifying numerals correspond to those of FIGS. 2 and 3 with the letter A added. Hence, no further description thereof is needed excepting to note that the rotation of the tool axis with respect to the workpiece axis in a cross axes relationship is here in a counterclockwise direction and that in such case the cutting edges of the teeth, spaced in the same manner as above described, lie in a right hand helix.

Thus, if one looks from the shaving gear toward the workpiece as illustrated in FIG. 2, the crossed-axes angle and lead direction of the helix 20 have the following relation with respect to one another.

When the crossed-axes angle 21 is formed by rotation of the tool axis with respct to the workpiece axis in a clockwise direction, the cutting edges on teeth spaced circumferentially as above described form a left-handed helix 22.

When the crossed-axes angle 21A is formed by rotation of the tool axis with respect to the workpiece axis in a counterclockwise direction, the cutting grooves on teeth spaced circumferentially a number of teeth equal to the number of teeth on the workpiece, or an integral multiple thereof, form a right-handed helix 22A.

The embodiments of the invention in which an exclusive property or privilege is claimed are defined as follows:

1. In a machine tool having a toothed tool wherein the tooth surfaces each have grooves extending from the tooth addendum to the tooth dedendum for forming cutting grooves for shaving of gears on a machine and wherein the tool spindle is rotated relative to the workpiece spindle as seen from the tool to the workpiece along the common perpendicular to the cross axes, the improvement comprising a plurality of selected circumferentially spaced first teeth on said tool, each pair of selected first teeth having a plurality of second teeth therebetween, the spacing between said selected first teeth being equal to the number of teeth of the workpiece times an integer, said cutting grooves on said selected first teeth being arranged on said selected first teeth to define a helix which, when viewed in a direction looking toward said workpiece along said common perpendicular, forms an angle with respect to the workpiece axis whose complement is less than the angle formed with respect to the workpiece axis by the tool axis, the cutting edges in said cutting grooves on said second teeth being out of alignment with said helix.

2. The device of claim 1 where the integer is one.

3. The device of claim 1 where the integer is more than one.

4. In a machine tool having a toothed tool wherein the tooth surfaces each have grooves extending from the tooth addendum to the tooth dedendum for forming cutting edges for the shaving of gears on said machine and also having a workpiece spindle so arranged that the tool spindle is angularly displaced in a clockwise direction from the workpiece spindle, as seen from the tool to the workpiece along the common perpendicular to the cross axes of both thereof, the improvement comprising a plurality of selected circumferentially spaced first teeth on said tool, each pair of selected first teeth having a plurality of second teeth therebetween, the spacing between said selected first teeth being in increments equal to an integer times the number of teeth on the workpiece, the corresponding ones of the cutting edges in said cutting grooves on said selected first teeth being positioned and arranged to define a left hand helix when viewed from said tool to said workpiece along said common perpendicular, the cutting edges in said cutting grooves on said second teeth being out of alignment with said helix.

5. The device of claim 4 wherein the integer is one.

6. The device of claim 4 wherein the integer is more than one.

7. In a machine tool having a toothed tool wherein the tooth surfaces each have grooves extending from the tooth addendum to the tooth dedendum for forming cutting edges for the shaving of gears on said machine and having further a workpiece spindle so arranged that the tool spindle is angularly displaced in a counterclockwise direction from the workpiece spindle, as same are seen from the tool to the workpiece along the common perpendicular to the cross axes of both thereof, the improvement comprising a plurality of selected circumferentially spaced first teeth on said tool, each pair of selected first teeth having a plurality of second teeth therebetween, the spacing between said selected first teeth being in increments equal to the number of teeth on the workpiece times a whole integer, the corresponding ones of the cutting edges in said cutting grooves on said selected first teeth being positioned and arranged to define a right hand helix when viewed from said tool to said workpiece along said common perpendicular, the cutting edges in said cutting grooves on said second teeth being out of alignment with said helix.

8. The device of claim 7 wherein the integer is one.

9. The device of claim 7 wherein the integer is more than one.

* * * * *